July 19, 1932.    C. W. BHOSYS    1,867,800

PHOTOGRAPHIC BACKGROUND

Original Filed Aug. 16, 1928

INVENTOR
Charles W. Bhosys.
BY
ATTORNEY

Patented July 19, 1932

1,867,800

UNITED STATES PATENT OFFICE

CHARLES WILLIAM BHOSYS, OF NEW YORK, N. Y.

PHOTOGRAPHIC BACKGROUND

Original application filed August 16, 1928, Serial No. 300,127. Divided and this application filed December 21, 1929. Serial No. 415,805.

This invention relates to the art of photography and more particularly refers to improvements in backgrounds adapted for the production of photographic compositions obtained by combining a plurality of exposures of the same subject.

In my patent for a method of producing multipose pictures, No. 1,813,436, granted July 7, 1931, on application Serial Number 300,127, filed August 16, 1928, of which copending application this application is a division, I have described and claimed a new method of producing photographic compositions by photographing the same subject or subjects at different times and in different positions on a single negative, without showing any line of demarcation between the different exposures.

Such photographic compositions can be produced with or without the use of a painted background; but when a painted background is used, it is necessary for the same to fulfill some requirements which are essential to the production of such compositions.

The main object of the present invention therefore is to provide a novel arrangement of photographic background for taking pictures permitting of producing novel and improved effects of the character above specified, and adapted to be easily operated and installed.

Other objects and advantages of the present invention will more fully appear as the description proceeds and will be set forth and claimed in the appended claims.

Double or multipose exposures of the same subject on the same negative have heretofore been produced by limiting the field of projection of the objective within the camera to a portion of the surface of the sensitized element, and by shifting the sensitized element to a successive position so as to expose a new portion thereof for each exposure.

The result is a series of two or three or more separate pictures of the same subject on the same negative; but the exposures thus obtained are sharply defined and independent of one another, and being totally unrelated do not produce a single photographic composition such as for instance, a group of people photographed together against a single background and in a single exposure.

The chief aim of this succession of fractional exposures of a sensitized element is to effect savings of material and time in producing various photographs, which need not necessarily be of the same subject; but there is no question in this case of producing photographic compositions having any special novelty or artistic value.

The present invention refers to a background for use in a process whereby various exposures of the same subject are taken on the same sensitized element at different times and in different relative positions, where the sensitized element is entirely exposed to photographic action at each exposure and does not have to be shifted from one position to another.

By using a special type of background and by paying proper attention to certain conditions governing the actinic value of various portions of the subject being photographed, it becomes possible to produce novel, puzzling and artistic effects giving the illusion of group of individuals or subjects being photographed at the same time in different positions and postures, said individuals or subjects all having the same features, only one individual or subject having actually been photographed.

My invention which is applicable both to still and to moving pictures, will be more clearly understood by referring to the accompanying drawing in which.

Referring to Figs. 1, 2, 3, 4, it will be seen that my improved background comprises a rear panel 11 which covers the entire field and which has a black or non-actinic surface, and a plurality of panels, 12, 13, 14 together forming the painted background, which may be independently placed in front of the rear panel or removed therefrom.

In the example shown, 12, 13 designate two side panels and 14 designates a center panel, and it is seen that the two side panels are slightly ahead of the center panel and have their inner edge portions 15, 16 overlapping the edge portions 17, 18 of the center panel.

When a multipose picture is produced using this type of background, each exposure is taken with the subject standing in front of the corresponding panel of the painted background while the remaining panels are removed so as to expose the nonactinic surface behind; the exposed panel therefore becomes a part of the finished picture.

When another part of the composition is produced by a succeeding exposure, the subject is placed in another position in front of the corresponding painted panel, and the other panels including the one which was previously exposed are withdrawn so as to expose the nonactinic surface of panel 11; and so on.

The ultimate result is a composition where not only the subject is portrayed in different poses which may be co-related or partly overlapping, but also the background is portrayed to give the true illusion of a group taken in front of the same.

The various panels composing the background can be of any suitable form or design as long as the painted ones can be moved on and off the range of the objective for the purpose stated.

Figure 1:
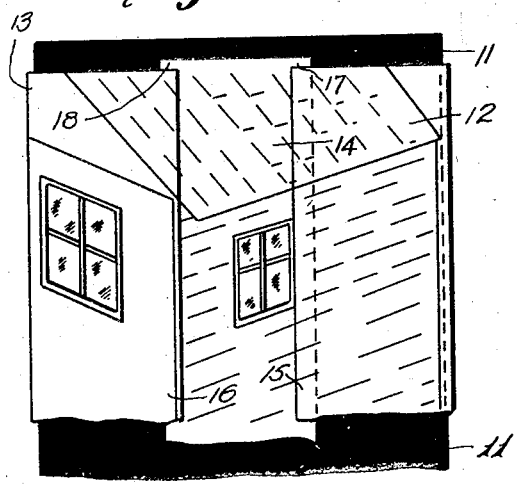
Fig. 1 is a fragmentary front view of a special type of photographic background which may be used in carrying my invention into practice.
Figure 2:
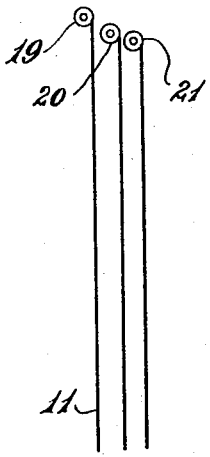
Fig. 2 is a side view in elevation thereof.

A convenient construction is shown in the drawing partly in Fig. 2 where it is seen that the various panels are of a flexible type and are mounted on rolls 19, 20, 21 upon which they can be wound or from which they can be unwound after the fashion in which ordinary shade rollers or stage settings are operated.

This co-relation of the two exposures makes it necessary to pay special attention to the relative positions of the two clasped hands in each exposure in order to make sure that a correct result will be achieved. In cases of this kind it is best to make use of some reference medium or gauge whereby the correct position of the two corelated portions of the picture can be determined.

Figure 5:
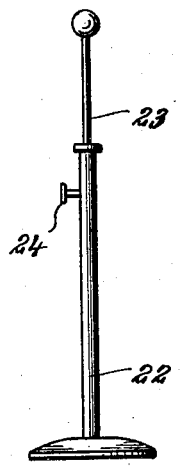
Fig. 5 is a front view in elevation of an adjustable standard which may be used as a reference medium in determining a pose of the subject in relation to its pose in a preceding or following exposure.
Figure 3:
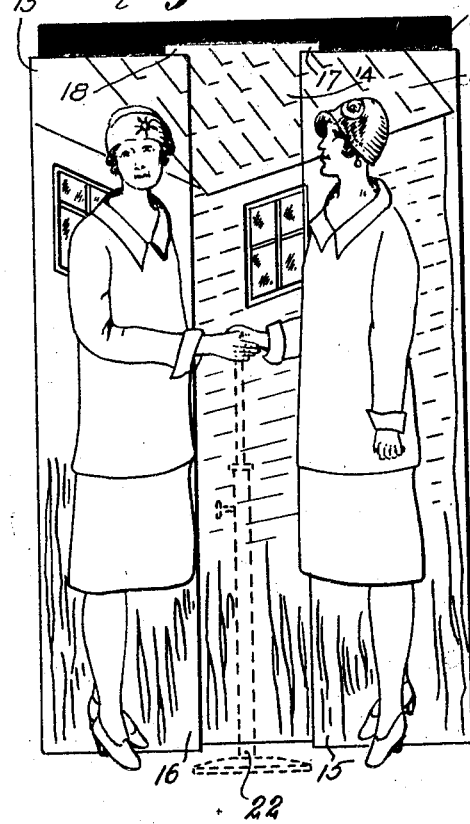
Fig. 3 is a front view illustrating two different co-related positions of the same subject producing together a photographic composition.
Figure 4:
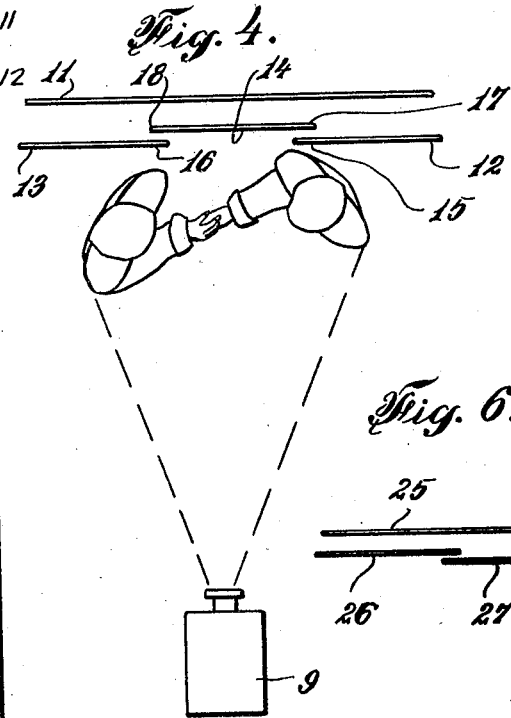
Fig. 4 is a plan view of the same.

For instance, in Fig. 5 I show a stand 22 provided with an adjustable standard 23 which may be set at any desired height by means of a set screw 24, and said stand is also shown in dotted lines at 22 in Fig. 3. In the same it will be seen that the right hand of the subject in each exposure is caused to rest upon the top of the standard 23 which has previously been adjusted at the proper height.

The stand itself however, must not appear in the picture, and therefore it is used merely as a gauge to determine the height of the hand before each exposure and it is removed before each picture is actually taken. If desired however, in one of the exposures, the stand may be used as a support for the hand provided it is concealed by a black or nonactinic colored cloth, and provided it does not conceal part of the subject.

When a painted field such as shown in Figs. 1 to 4 is used, the central panel should preferably be a little darker than the side panels so as to produce an effect of depth in the background, this being in conformity with the current practice in the use of painted backgrounds where the central portion is generally darker. Furthermore the side sections or panels should overlap the central panel in order to produce an effect of continuity without sharp lines of demarcation.

The number of painted panels forming a sectional background, may of course be less or more than three, in so long as said panels may be removed or replaced at will in order to expose or cover part of the nonactinic surface at the rear.

Figure 6:
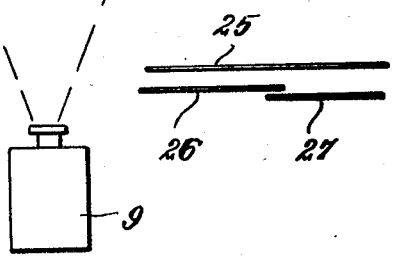
Fig. 6 is a plan view of a background in which only two painted panels are used instead of three in combination with a nonactinic background.

For instance, in Fig. 6 I illustrate a sectional background in which 25 designates the rear nonactinic panel and 26, 27 designate two painted panels forming together a sectional painted background.

It is obvious that in carrying my invention into practice some of the constructional details may vary to a certain extent from those shown and described without departing from the inventive idea; the drawing is therefore to be considered as being intended for illustrative purposes only and not in a limiting sense. Accordingly, I reserve the right to carry my invention into practice in all those ways and manners which may enter, fairly, into the scope of the appended claims.

I claim:

1. A background for use in photographic work, comprising an element having a nonactinic surface providing a photographically inactive field, and a field having a painted surface arranged in front thereof, said painted surface field being composed of sections adapted to cover or uncover corresponding portions of said non-actinic surface, independently of one another.

2. A background for use in photographic work, comprising an element having a nonactinic surface providing a photographically inactive field, and a field having a painted surface arranged in front thereof, said painted surface field being composed of flexible sections adapted to cover or uncover corresponding portions of said non-actinic surface, independently of one another, and means for rolling up or unrolling said sections.

3. A background for use in photographic work, comprising an element having a non-actinic surface providing a photographically inactive field, and a field having a painted surface arranged in front thereof, said painted surface field being composed of three vertical sections adapted to cover or uncover corresponding portions of said non-actinic surface, independently of one another, the inner marginal portions of the two outer sections overlapping the marginal portions of the central section.

4. A background for use in photographic work, comprising an element having a non-actinic surface providing a photographically inactive field, and a field having a painted surface arranged in front thereof, said painted surface field being composed of three vertical sections adapted to cover or uncover corresponding portions of said non-actinic surface, independently of one another, the two outer sections being frontwardly spaced from the central section and having their inner marginal portions overlapping the marginal portions of said central section.

5. A background for use in photographic work, comprising an element having a non-actinic surface providing a photographically inactive field, and a field having a painted surface arranged in front thereof, said painted surface field being composed of three vertical sections adapted to cover or uncover corresponding portions of said non-actinic surface, independently of one another, the inner marginal portions of the two outer sections overlapping the marginal portions of the central section, and means for rolling up or unrolling said sections.

6. A background for use in photographic work, comprising an element having a non-actinic surface providing a photographically inactive field, and a field having a painted surface arranged in front thereof, said painted surface field being composed of three vertical sections adapted to cover or uncover corresponding portions of said non-actinic surface, independently of one another, the two outer sections being frontwardly spaced from the central section and having their inner marginal portions overlapping the marginal portions of said central section, and means for rolling up or unrolling said sections.

CHARLES W. BHOSYS.